(12) United States Patent
Walczyk et al.

(10) Patent No.: US 12,410,934 B2
(45) Date of Patent: Sep. 9, 2025

(54) AIR HANDLING UNIT AND METHOD USING REINFORCEMENT LEARNING MODEL THAT REPLICATES MODEL PREDICTIVE CONTROL SIMULATION

(71) Applicant: Tyco Fire & Security GmbH, Neuhausen am Rheinfall (CH)

(72) Inventors: Matthias Walczyk, Duesseldorf (DE); Andrew S. Pike, Santa Cruz, CA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 452 days.

(21) Appl. No.: 17/900,141

(22) Filed: Aug. 31, 2022

(65) Prior Publication Data
US 2024/0068692 A1    Feb. 29, 2024

(51) Int. Cl.
| | |
|---|---|
| *F24F 11/63* | (2018.01) |
| *F24F 11/80* | (2018.01) |
| *F24F 13/10* | (2006.01) |
| *G05B 13/02* | (2006.01) |
| *F24F 110/10* | (2018.01) |
| *F24F 120/10* | (2018.01) |
| *F24F 130/10* | (2018.01) |

(52) U.S. Cl.
CPC ............. *F24F 11/63* (2018.01); *F24F 11/80* (2018.01); *F24F 13/10* (2013.01); *G05B 13/0265* (2013.01); *F24F 2110/10* (2018.01); *F24F 2120/10* (2018.01); *F24F 2130/10* (2018.01)

(58) Field of Classification Search
None
See application file for complete search history.

(56) References Cited

U.S. PATENT DOCUMENTS

| | | | |
|---|---|---|---|
| 6,019,677 A * | 2/2000 | Demster | F24F 13/068 454/316 |
| 10,495,337 B2 | 12/2019 | Turney et al. | |
| 11,067,955 B2 | 7/2021 | Patel et al. | |
| 2012/0232702 A1* | 9/2012 | Vass | G05D 23/1934 700/277 |
| 2015/0332294 A1* | 11/2015 | Albert | G06Q 30/0202 705/7.31 |
| 2018/0306459 A1 | 10/2018 | Turney | |
| 2018/0372363 A1 | 12/2018 | Park et al. | |
| 2019/0041811 A1 | 2/2019 | Drees | |

(Continued)

FOREIGN PATENT DOCUMENTS

| | | |
|---|---|---|
| WO | WO-2021/026369 A1 | 2/2021 |
| WO | WO-2021/179250 A1 | 9/2021 |
| WO | WO-2022/120158 A1 | 6/2022 |

OTHER PUBLICATIONS

U.S. Appl. No. 17/710,443, filed Mar. 31, 2022, Johnson Controls Tyco IP Holdings LLP.

(Continued)

*Primary Examiner* — Bernard G Lindsay
(74) *Attorney, Agent, or Firm* — Foley & Lardner LLP

(57) ABSTRACT

A method includes generating a mixed air temperature value using a reinforcement learning model running on the edge controller. A temperature setpoint and a weather forecast are inputs to the reinforcement learning model. The method also includes controlling damper positions of an air handling unit to achieve the mixed air temperature value.

15 Claims, 10 Drawing Sheets

(56) References Cited

U.S. PATENT DOCUMENTS

| | | |
|---|---|---|
| 2019/0338973 A1 | 11/2019 | Turney et al. |
| 2019/0338974 A1 | 11/2019 | Turney et al. |
| 2019/0338977 A1 | 11/2019 | Turney et al. |
| 2019/0353378 A1 | 11/2019 | Ramamurti et al. |
| 2019/0354071 A1 | 11/2019 | Turney et al. |
| 2019/0378020 A1 | 12/2019 | Camilus et al. |
| 2019/0383510 A1 | 12/2019 | Murugesan et al. |
| 2019/0384239 A1 | 12/2019 | Murugesan et al. |
| 2019/0385070 A1 | 12/2019 | Lee et al. |
| 2020/0042918 A1 | 2/2020 | Wenzel et al. |
| 2020/0073342 A1 | 3/2020 | Lee et al. |
| 2020/0076196 A1 | 3/2020 | Lee et al. |
| 2020/0355391 A1 | 11/2020 | Wenzel et al. |
| 2020/0356857 A1 | 11/2020 | Lee et al. |
| 2020/0363794 A1 | 11/2020 | Schuster et al. |
| 2021/0018211 A1 | 1/2021 | Ellis et al. |
| 2021/0048785 A1 | 2/2021 | Drees |
| 2021/0049460 A1* | 2/2021 | Ahn .................. G06N 3/047 |
| 2021/0055016 A1 | 2/2021 | Turney |
| 2021/0056384 A1* | 2/2021 | Ko .................. G06N 3/006 |
| 2021/0056412 A1* | 2/2021 | Jung .................. G06N 3/045 |
| 2021/0089910 A1* | 3/2021 | Zheng .................. G06N 3/08 |
| 2021/0173360 A1 | 6/2021 | Drees |
| 2021/0190364 A1 | 6/2021 | Lee et al. |
| 2021/0191342 A1 | 6/2021 | Lee et al. |
| 2021/0191343 A1 | 6/2021 | Lee et al. |
| 2021/0191348 A1 | 6/2021 | Lee et al. |
| 2021/0285671 A1 | 9/2021 | Du et al. |
| 2021/0383276 A1 | 12/2021 | Ramamurti et al. |
| 2022/0018566 A1* | 1/2022 | Kurganskii ............ G06N 20/00 |
| 2022/0026864 A1 | 1/2022 | Murugesan et al. |
| 2022/0035324 A1 | 2/2022 | Du et al. |
| 2022/0244682 A1 | 8/2022 | Walczyk et al. |
| 2022/0299233 A1 | 9/2022 | Risbeck |
| 2023/0195843 A1* | 6/2023 | Kaneko ................. G06F 18/217 706/12 |

OTHER PUBLICATIONS

U.S. Appl. No. 17/710,597, filed Mar. 31, 2022, Johnson Controls Tyco IP Holdings LLP.
U.S. Appl. No. 17/710,603, filed May 9, 2022, Johnson Controls Tyco IP Holdings LLP.
U.S. Appl. No. 17/710,706, filed Mar. 31, 2022, Johnson Controls Tyco IP Holdings LLP.
U.S. Appl. No. 17/733,786, filed Apr. 29, 2022, Johnson Controls Tyco IP Holdings LLP.
Chen et al., "Gnu-RL: A Practical and Scalable Reinforcement Learning Solution for Building HVAC Control Using a Differentiable MPC Policy," Frontiers in Built Environment, Nov. 13, 2020 (18 pages).

* cited by examiner

AIR HANDLING UNIT AND METHOD USING REINFORCEMENT LEARNING MODEL THAT REPLICATES MODEL PREDICTIVE CONTROL SIMULATION

BACKGROUND

The present disclosure relates generally to the field of building equipment, for example building equipment in building management systems (BMSs). A BMS is, in general, a system of devices configured to control, monitor, and manage equipment in or around a building. A BMS can include, for example, a HVAC system, a security system, a lighting system, a fire alerting system, any other system that is capable of managing building functions or devices, or any combination thereof.

A BMS can provide high-level control of building equipment and/or spaces, for example by providing a temperature setpoint for a building or building space, and may use various advanced, computationally-intensive approaches for example to reduce energy usage, improve occupant comfort, etc. Such setpoints can be provided to edge equipment (e.g., air handling units, chillers, variable air volume boxes, etc.). However, control of equipment at the edge (locally at equipment units) to implement such targets from the BMS is typically less sophisticated, for example due to limited computing power and memory available in edge controllers. Improved efficiency could be achieved by better controlling internal equipment parameters such as damper positions, fan speeds, mixed air temperature, etc. to achieve targets set by a BMS.

SUMMARY

One implementation of the present disclosure is a method including generating a mixed air temperature value using a reinforcement learning model running on the edge controller. A temperature setpoint and a weather forecast are inputs to the reinforcement learning model. The method also includes controlling damper positions of an air handling unit to achieve the mixed air temperature value.

In some embodiments, the method also includes automatically updating, by the edge controller, the reinforcement learning model based on a reward function including a difference between the indoor air temperature setpoint and a measured indoor air temperature. In some embodiments, the reward function is further based on an occupancy of a space served by the air handling unit.

In some embodiments, using the reinforcement learning model includes performing feature generation on streaming input data based on logic in a functional programming language and using variables resulting from the feature generation as inputs to a model. In some embodiments, generating the mixed air temperature value using the reinforcement learning model running on the edge controller also includes processing streams of building and equipment state information at the edge controller.

In some embodiments, the method also includes creating the reinforcement learning model on a computing system separate from the edge controller and transferring the reinforcement learning model from the computing system to the edge controller after the initial training. Creating the reinforcement learning model may include training the reinforcement learning model to replicate outputs of a model predictive control algorithm running in a simulation.

In some embodiments, the method includes determining, by the model predictive control algorithm, simulated mixed air temperatures which minimize a simulated objective associated with running a simulated air handling unit in the simulation. In some embodiments, the inputs to the artificial intelligence algorithm also include an occupancy forecast.

Another implementation of the present disclosure is a method of controlling a unit of building equipment. The method includes receiving a setpoint for a condition of a building space and a measurement of the condition of a building space at an edge controller of a unit of building equipment and generating a control value for an internal parameter of the unit of building equipment by running a reinforcement learning process on the edge controller, which can include reinforcing learning of a model of the reinforcement learning process using the setpoint and the measurement and using the setpoint and the measurement as inputs to the model for generating the control value. The method can also include controlling, by the edge controller, the unit of building equipment in accordance with the control value.

In some embodiments, the method includes performing initial training of the model at a computing system separate from the edge controller and providing the model from the computing system to the edge controller after the initial training. Performing the initial training of the model can include training the artificial intelligence algorithm to replicate outputs of a model predictive control algorithm running in a simulation. Performing the initial training of the model can include determining, by running a simulation, simulated mixed air temperatures which minimize a simulated objective associated with running a simulated version of the unit of building equipment.

In some embodiments, the inputs to the model for generating the control value also include an occupancy forecast. In some embodiments, the inputs to the model also include values for a plurality of state variables corresponding to states of the unit of building equipment or the building space. In some embodiments, reinforcing learning of the model using the setpoint and the measurement includes updating the model based on a reward function. The reward function can include a difference between setpoint and the measurement. The reward function may also account for an amount of consumption associated with operating the unit of building equipment.

In some embodiments, an air handling unit includes a plurality of dampers and a local controller programmed to control the plurality of dampers by generating a mixed air temperature value using an reinforcement learning model running on the controller and controlling damper positions of an air handling unit to achieve the mixed air temperature value. Inputs to the reinforcement learning model can include a temperature setpoint and a weather forecast.

In some embodiments, the local controller is also programmed to automatically update the reinforcement learning model using reinforcement learning based on a difference between an indoor temperature setpoint for a building served by the air handling unit and a measurement of the indoor temperature setpoint. In some embodiments, the mixed air temperature value is a change in mixed air temperature of the air handling unit to be achieved by controlling the damper positions.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Building HVAC Systems and Building Management Systems

Figure 1:
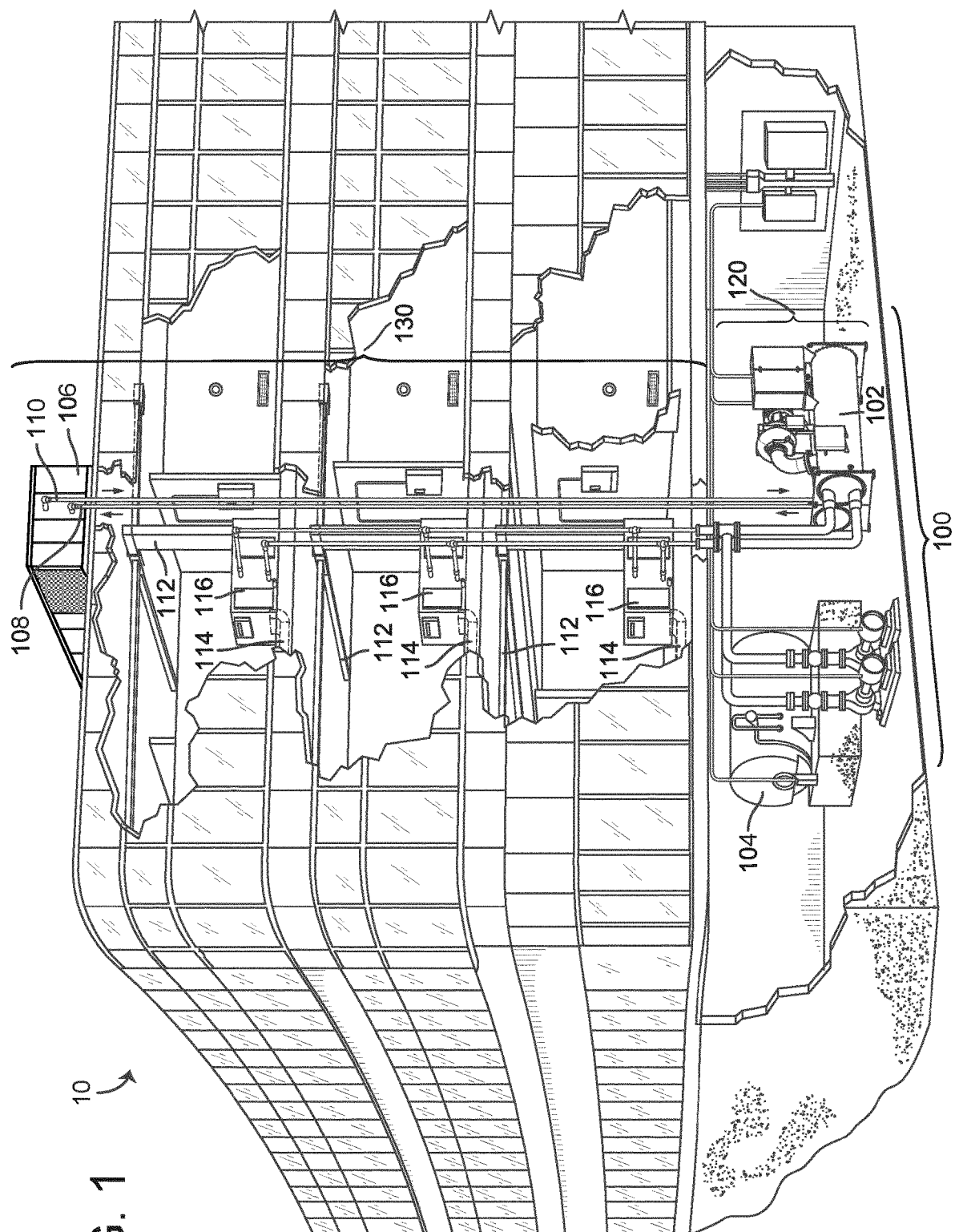
FIG. 1 is a drawing of a building equipped with a HVAC system, according to some embodiments.
Figure 2:
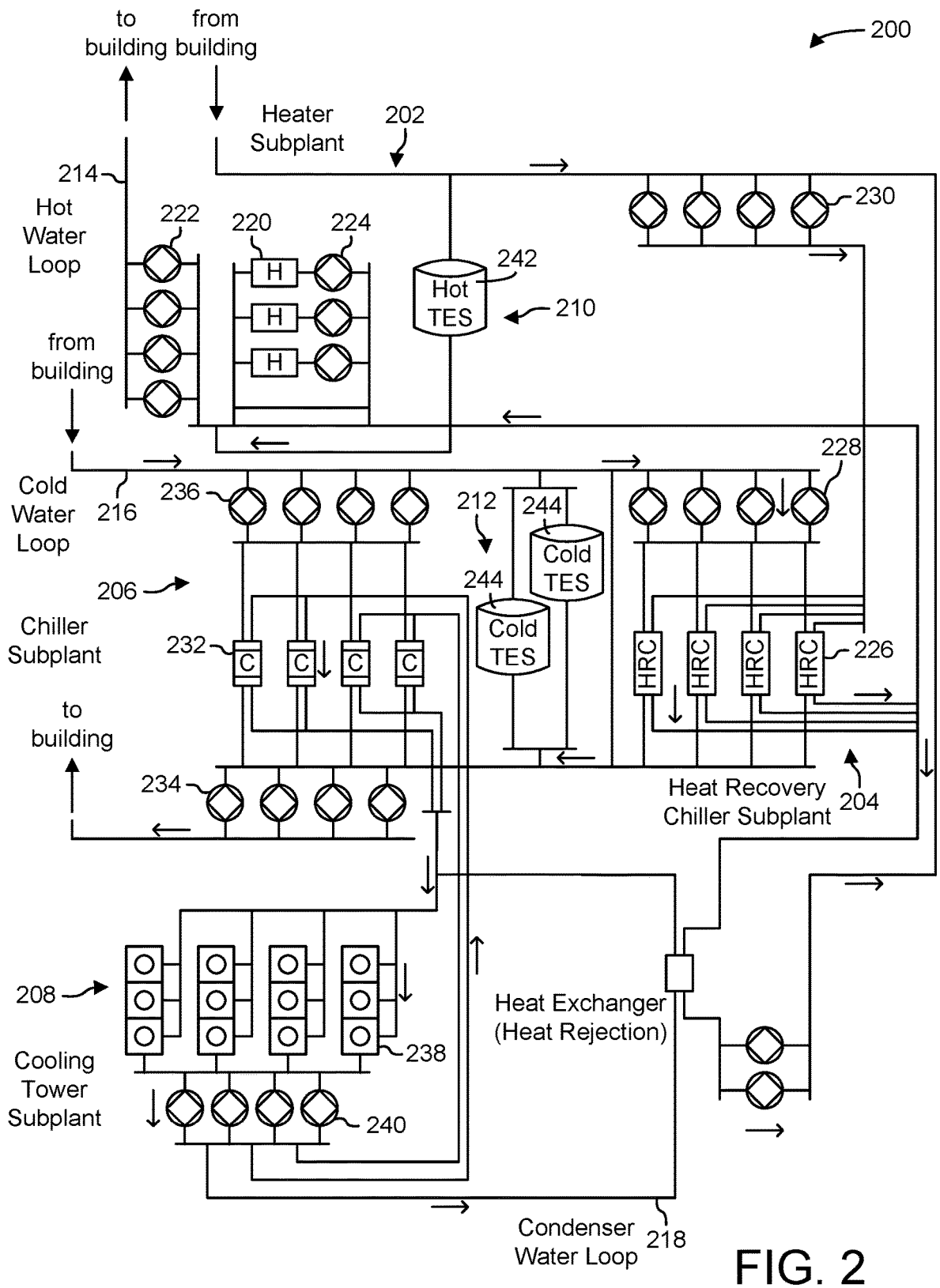
FIG. 2 is a block diagram of a waterside system that may be used in conjunction with the building of FIG. 1, according to some embodiments.
Figure 3:
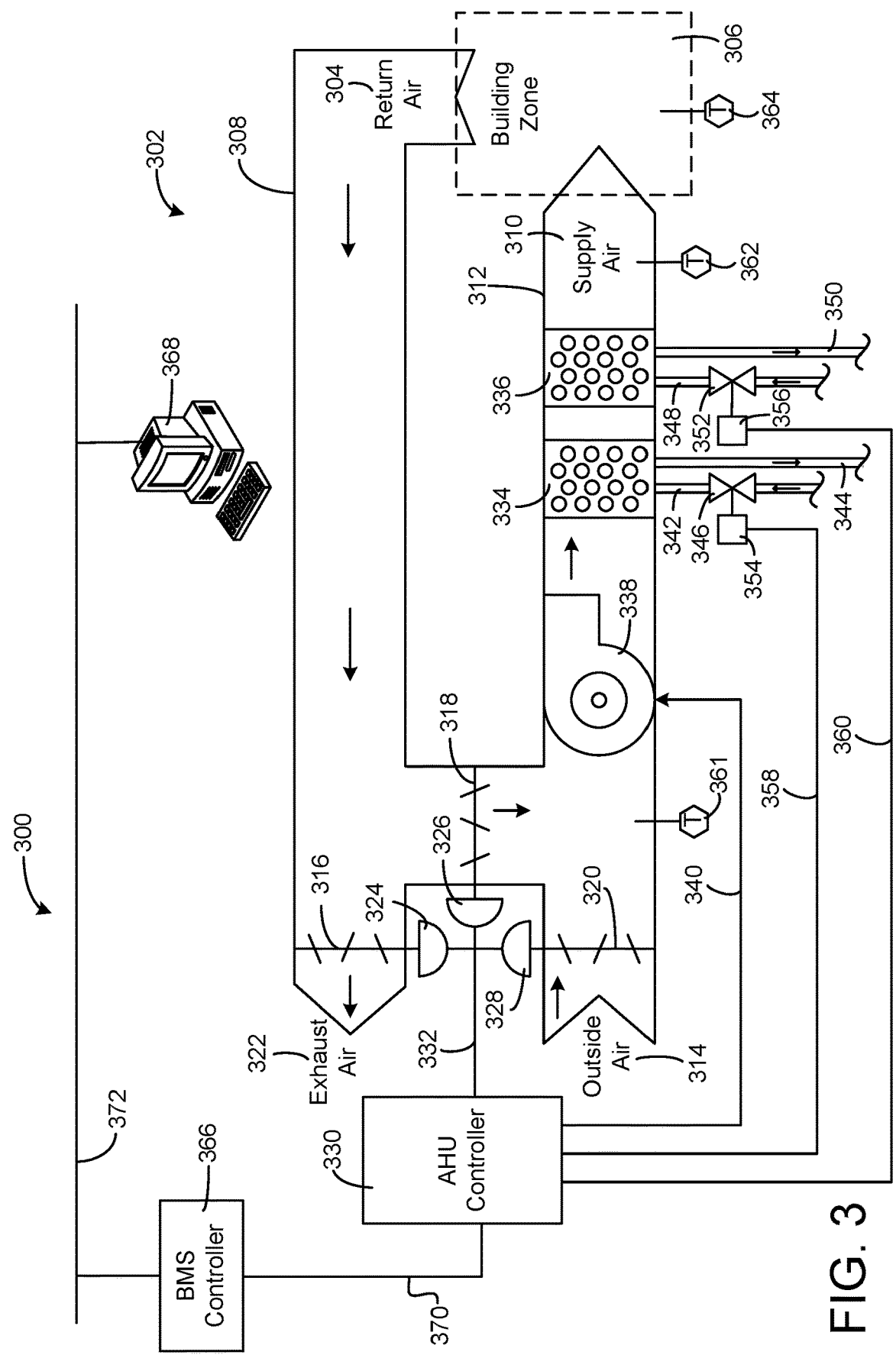
FIG. 3 is a block diagram of an airside system that may be used in conjunction with the building of FIG. 1, according to some embodiments.
Figure 4:
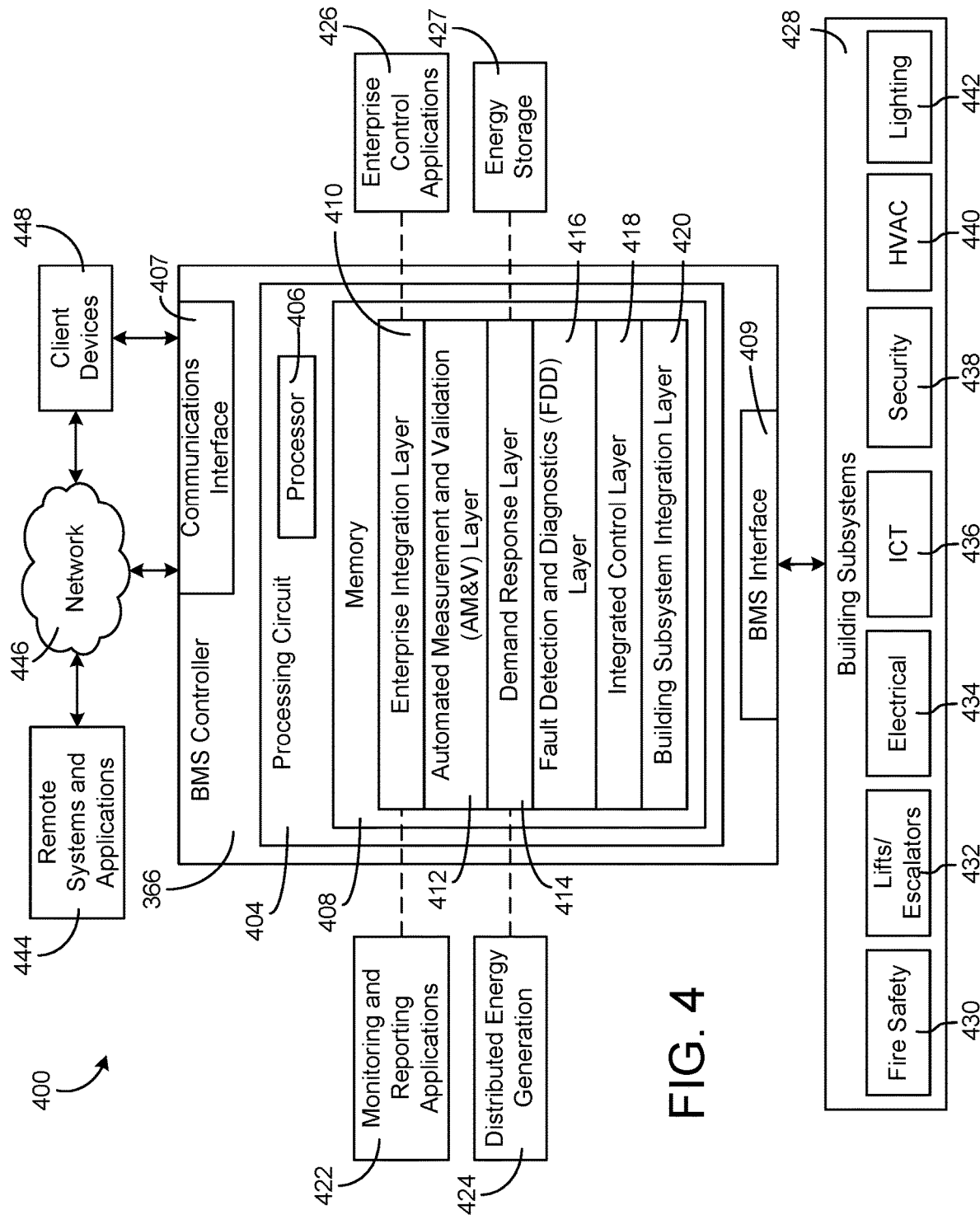
FIG. 4 is a block diagram of a building management system (BMS) that may be used to monitor and/or control the building of FIG. 1, according to some embodiments.
Figure 5:
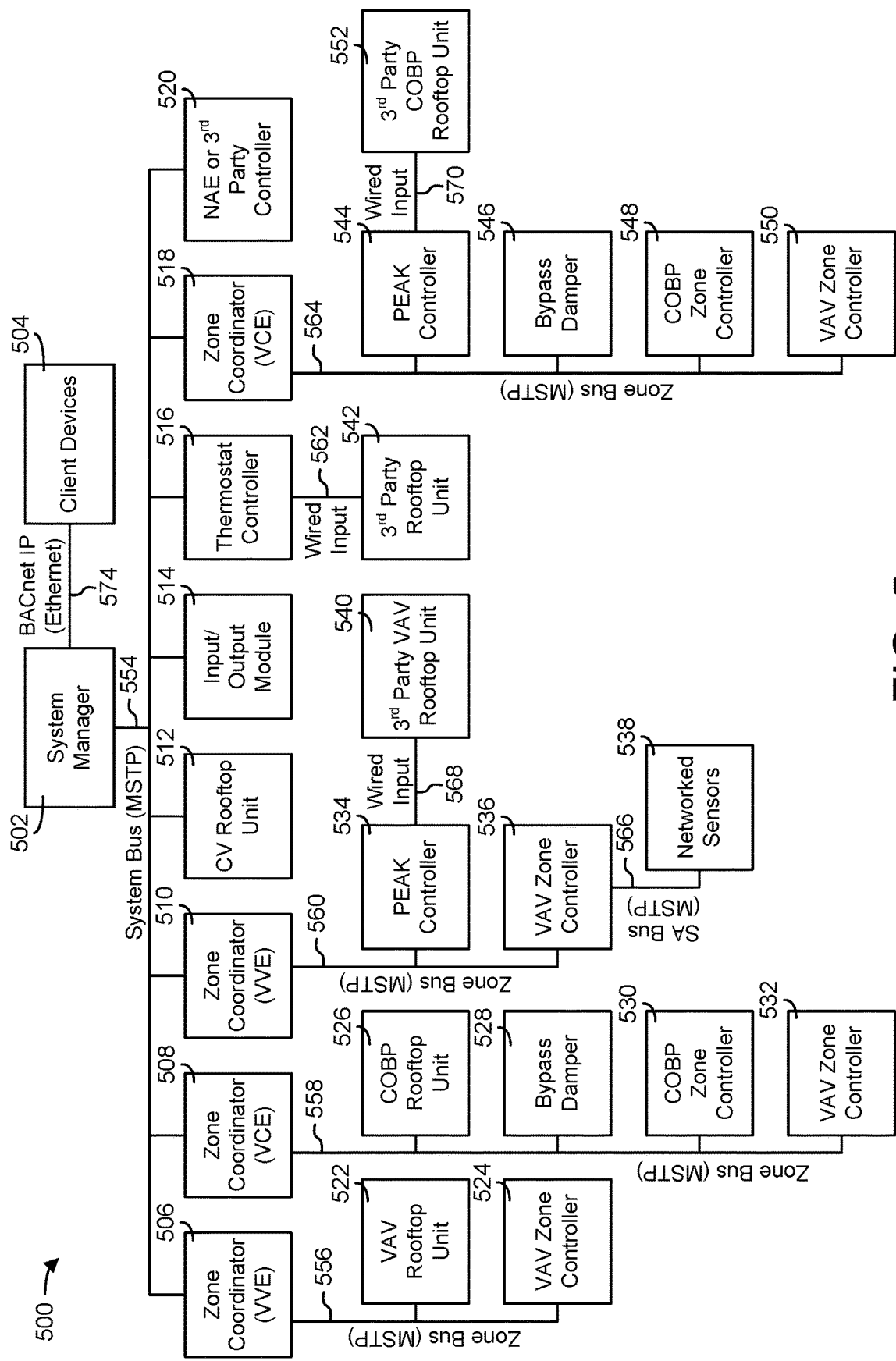
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire safety system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants Based on the particular configuration of waterside system 200 and the types of loads served by waterside system 200.

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-Based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306. AHU controller 330 mays also receive a measurement of a mixed air temperature from a temperature sensor 361 positioned upstream of cooling coil 334 and heating coil 336 and downstream of dampers 320, 318.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-Based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Referring now to FIG. 4, a block diagram of a building management system (BMS) 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-Based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 Based on the inputs, generate control signals Based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) Based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be Based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs Based on one or more inputs representative of or Based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or Based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super-system. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels Based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Equipment Control System and Edge Controller with Reinforcement Learning

Figure 6:
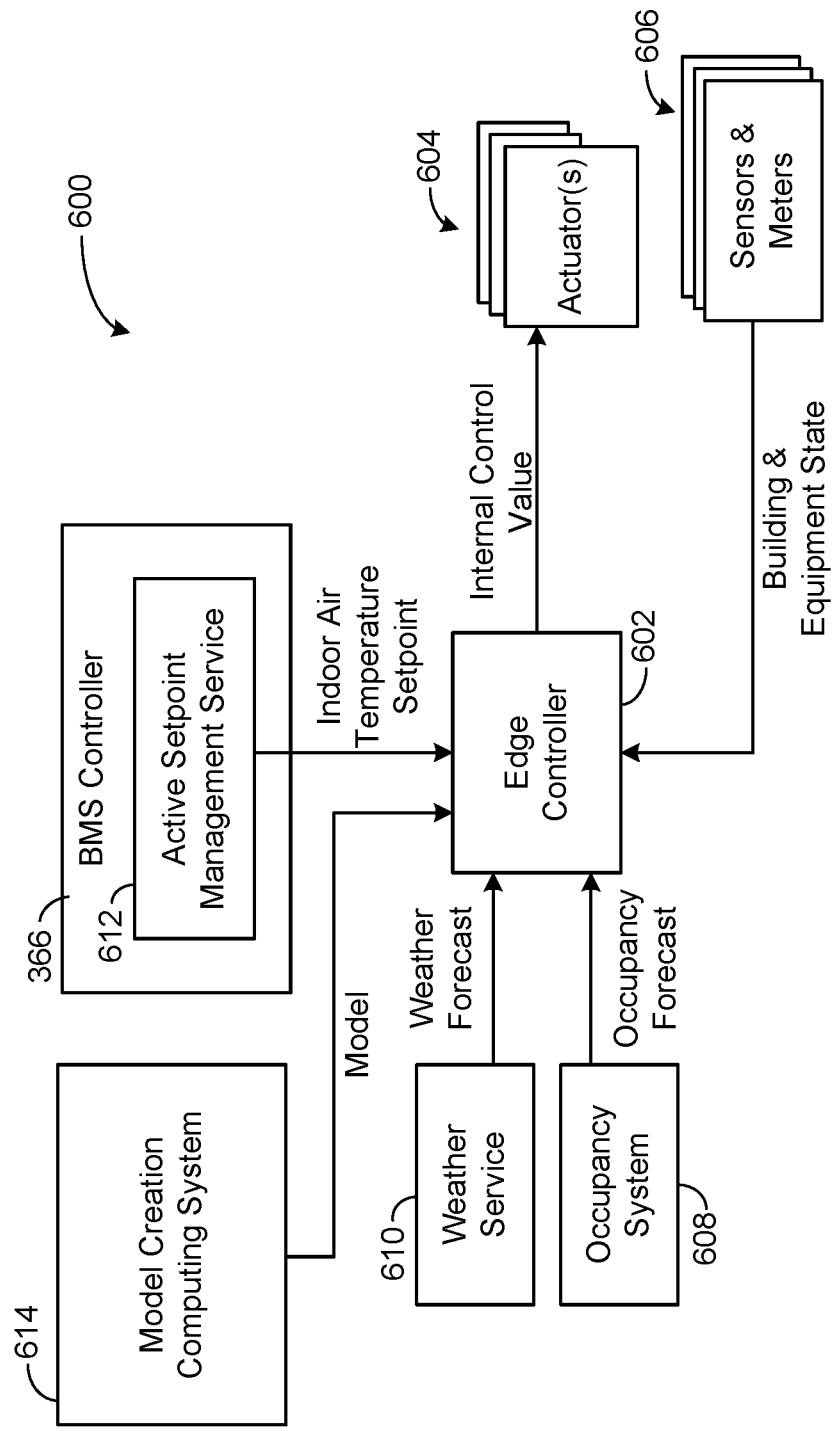
FIG. 6 is a block diagram of a control system for building equipment, according to some embodiments.
Figure 7:
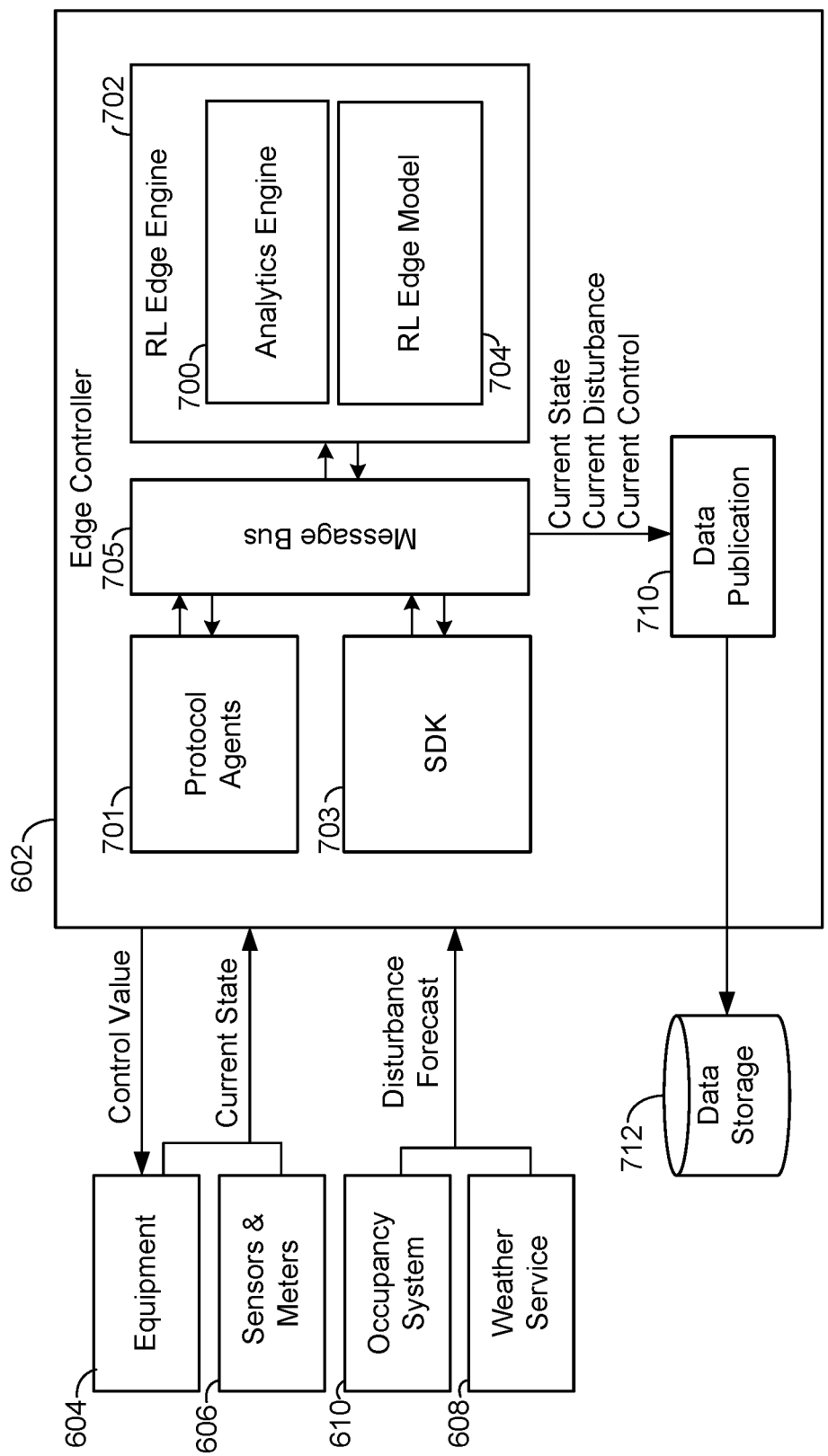
FIG. 7 is a block diagram showing an edge controller of the control system of FIG. 6, according to some embodiments.

Referring now to FIGS. 6-7, block diagrams of a control system 600 are shown, according to some embodiments. In some embodiments, the control system 600 is part of a building management system and/or includes components which are included in a building management system (e.g., BMS 400, BMS 500). As shown in FIG. 6, the control system 600 includes an edge controller 602 communicable with one or more actuators 604, one or more sensors and/or meters 606, an occupancy system 608, a weather service 610, an active setpoint management service 612 (shown as part of BMS controller 366), and a model creation computing system 614 (shown as including a simulator 616 and a model trainer 618). In some embodiments, the model computing system 614, the weather service 610, the occupancy system 608 and/or one or more of the one or more sensors/meters 606 communicate with the edge controller 602 via the BMS controller 366 or other component of a building management system.

In some embodiments, the control system 600 operates with or as part of the airside system 300 of FIG. 3, for example. In such embodiments, the AHU controller 330 can be provided as the edge controller 602 (i.e., the edge controller 602 may be an embodiment of the AHU controller 330) and the actuator(s) 604 can include the actuators 324, 326, 328 which operate the exhaust air damper 316, mixing damper 318, and outside air damper 320 of air handling unit 302. The edge controller 602 can thereby control the air handling unit 302, or at least one or more of the actuators 324, 326, 328 of the air handling unit 302. In some embodiments, one or more of the actuators 324, 326, 328 is a smart actuator and the edge controller 602 is included as part of the smart actuator (e.g., in a same housing as the actuator, etc.). In various embodiments, the actuator(s) 604 may operate to control various dampers, valves, fans, compressors, etc. as suitable for control of corresponding types of equipment.

In some embodiments, the control system 600 operates with or as part of the airside system 300 described with reference to FIG. 3. For example, the sensors/meters 606 can include temperature sensors for measuring air temperature at various locations within the air handling unit 302 or upstream or downstream of the air handling unit 302. For example, sensors/meters 606 may include the temperature sensor 362 arranged to measure the temperature of the supply air 310, a temperature sensor 361 arranged to measure a mixed air temperature (i.e., the temperature of mixed air created by mixing the outside air 314 with the return air 304 downstream of the outside air damper 320 and the mixing damper 318, which may be equivalent to the temperature of the air entering the fan 338 upstream of the heating coil 336 and the cooling coil 334), etc. The sensors/meters 606 may also include the sensor 364 shown in FIG. 3 for measuring an indoor air temperature of a building zone 306, a meter for measuring or estimating an amount of energy provided by and/or consumed by the cooling coil 334 and/or heating coil 336, humidity sensors, airflow sensors, air quality sensors, etc.

The edge controller 602 is configured to (e.g., programed to) control the actuator(s) 604 based on an indoor air temperature setpoint, state information from the sensor(s)/meter(s) 606, and disturbance information from the weather service 610 and/or occupancy system 608 using an artificial intelligence algorithm, for example using a reinforcement learning model. As shown, the edge controller 602 can determine one or more internal control values for a unit of building equipment to be provided to actuator(s) 604. For example, the edge controller 602 can determine a desired change in mixed air temperature for an air handling unit 302 (e.g., an amount by which the mixed air temperature should be changed from a current time step to a subsequent time step). The edge controller 602 and/or the AHU controller 330 can use the desired change in the mixed air temperature for controlling actuators 324-328 which operate dampers 316-320 of the air handling unit 302 to affect the mixed air temperature. The internal control value (e.g., the mixed air temperature or the mixed air temperature setpoint) is distinct from the indoor air temperature setpoint for a building space (e.g., the temperature of the air within the building zone 306) served by such equipment, the temperature of the supply air 310 discharged from the air handling unit 302, or other building setpoint or target such as an amount of heat to be added/removed to the building space, a humidity setpoint for the building space, an air quality setpoint for the building space, etc. In some embodiments, the internal control value is a mixed air temperature, mixed air temperature setpoint, desired change in the mixed air temperature, or desired change in the mixed air temperature setpoint. In this context, the mixed air may be the air created by mixing or combining the return air 304 with the outside air 314 within the air handling unit 302, before the mixed air is heated, cooled, humidified, dehumidified, or otherwise treated to generate the supply air 310 discharged from the air handling unit 302, i.e., as measurable at temperature sensor 361 in FIG. 3. The edge controller 602 may be included with the unit of equipment, for example positioned inside the equipment, mounted on the equipment, distributed in a package with the unit of equipment, etc. The edge controller 602 may be coupled to and integrated with an actuator, a damper, a valve, etc. in various embodiments.

As shown in FIG. 6, the edge controller 602 receives an indoor air temperature setpoint from active setpoint management service 612. The active setpoint management service 612 can change the indoor air temperature setpoint over time, for example to ensure at least a certain degree of occupant comfort while reducing energy consumption, utility costs, carbon emissions, etc. The active setpoint management service 612 may output the indoor air temperature setpoint by performing a predictive optimization. The active setpoint management service 612 may set a schedule of temperature setpoints which vary over time, for example shifting energy load by pre-cooling or pre-heating a building space. In some embodiments, the active setpoint management service 612 uses model predictive control to generate the indoor air temperature setpoint, for example as described in U.S. Pat. No. 10,495,337, filed Apr. 28, 2017, the entire disclosure of which is incorporated by reference herein. In some embodiments, the active setpoint management service 612 is configured as a low-level airside controller as in U.S. Pat. No. 11,067,955, filed Jun. 30, 2016, the entire disclosure of which is incorporated by reference herein. The edge controller 602 can receive values of the indoor air temperature setpoint for multiple time steps (e.g., for a few hours ahead) and such that the indoor air temperature setpoint changes over time. The examples herein referring to indoor air temperature may be adapted for other states or conditions of a building, such as humidity, pressure, air quality, airflow, etc.

In some systems in which a timeseries of temperature setpoints is optimized (e.g., by the active setpoint management service 612), the equipment may attempt to track that setpoint in a non-optimal manner. In some examples, equipment is controlled using a reactive on/off approach where an equipment unit is turned on when a measured indoor temperature deviates from a setpoint and turns off when the measured indoor temperature is returned to the setpoint by operation of the equipment. As described in further detail below, the edge controller 602 can provide proactive control in anticipation of changes in indoor temperature which can reduce overall energy consumption of the equipment and improve how well an actual indoor temperature tracks the setpoint provided by the active setpoint management service 612 as compared to a reactive on/off control approach. Additional improvements to equipment operation are thereby provided by operation of the edge controller 602 as described herein, i.e., improvements beyond the efficiencies provided by active management of one or more building setpoints by the active setpoint management service 612.

The edge controller 602 is programmed to determine an action, shown as the internal control value in FIG. 6. In some embodiments, the action is denoted as $U_t = u$ and is determined given the current state $X_t = x$ based on a policy $\pi_\theta$. Operations executed by the edge controller 602 in such embodiments can be expressed as: $u = \pi_\theta(x)$ to determine the control action to take. In some embodiments, disturbances d are also inputs to the model, such that $u = \pi_\theta(x, d)$. The policy $\pi_\theta$ can be provided as an artificial intelligence model, for example a neural network model with parameters $\theta$.

Execution of action u via control of actuators 604 leads to a change in the state to $X_{t+1} = x'$ based on the system dynamics (e.g., thermodynamics of a building space) and leads to a reward $R_{t+1} = r$. The reward R may be based on an objective function (cost function), for example based on a deviation of a measured indoor temperature from the indoor temperature setpoint and/or an energy consumption of the equipment unit (e.g., $r = -C(x,u)$ with the reward representing a negative of cost C such that the reward r is maximized by the edge controller 602). In such embodiments, the edge controller 602 can update the policy (model) parameters $\theta$ to $\theta^*$ by maximizing the expected reward (minimizing the objective or cost), e.g., $\theta^* = \mathrm{argmax}_\theta(r)$, thereby reinforcing learning embodied by the parameters of the model. In some embodiments, the parameters are updated using a proximal policy optimization approach, whereby the change in parameters is limited between consecutive updates to improve stability and robustness of the model.

In the example of FIG. 6, the policy (model) is created and initially trained at the model creation computing system 614. The model creation computing system 614 may be separate from (e.g., remote from) the edge controller 602. For example, the model creation computing system 614 may be provided via one or more servers, processors, databases, etc. of a cloud computing system. Accordingly, the model creation computing system 614 may be significantly more powerful and larger (e.g., more processing power and memory) as compared to the edge controller 602, enabling operations to be performed at the model creation computing system 614 which are too extensive to be performed on the edge controller 602 in some embodiments.

In some embodiments, the model creation computing system 614 creates the model and trains the model to imitate a controller operating in a simulation run by the model creation computing system 614. For example, the model creation computing system 614 simulates building states, weather, equipment operation, etc., with a simulated controller generating simulated internal control values (actions) for simulated equipment. The simulation may be based on generic building modelling and simulation software and/or may be based on historical data specific to the building and/or equipment to be served by the edge controller 602. For example, the model creation computing system 614 may use the EnergyPlus™ building energy simulation program funded by the U.S. Department of Energy. The simulation may require more computing power and/or memory than is available locally on the edge controller 602 in some embodiments.

In some embodiments, the controller in the simulation is an ideal or optimal controller which operates the equipment at minimal possible value of the reward function (e.g., minimum cost, minimum deviation from indoor temperature setpoint, etc.). In some embodiments, the controller in the simulation is a model predictive controller running in the simulation to generate simulated control values based on an optimizing a predicted cost (and/or other objective) of simulated operation of the equipment in the simulation (e.g., given a variety of simulated weather, occupancy, and other conditions). For example, in an example where the edge controller 602 determines a mixed air temperature for controlling an air handling unit, the mode creation computing system 614 can execute, within the simulation and using a model predictive control algorithm, a simulated mixed air temperatures which minimize a simulated objective associated with running a simulated air handling unit in the simulation.

The model creation computing system 614 can train the model (RL model, artificial intelligence algorithm, policy, etc.) to replicate the behavior of the simulated controller, for example by selecting parameters which minimize differences between the outputs of the simulated controller under various input conditions and the outputs of the model under the same input conditions. The model is thereby trained to take system state and, in some embodiments, disturbance inputs and output an action (e.g., value for an internal control variable) which results in optimal behavior in the simulation, i.e., matching the output that would be provided by the simulated controller.

The model creation computing system 614 can then provide the trained model to the edge controller 602. The model may be received the edge controller 602 in a sufficiently-trained state to initiate online operations of the edge controller 602. The edge controller 602 may then perform reinforcement learning during online operations to fine-tune the model to actual building dynamics and to adjust the model overtime as building dynamics change (due to seasonal changes, space reconfigurations, utilization and occupancy changes, etc.). Pre-training the model offline and remote from the edge controller 602 can enable online operations prior to and early in such reinforcement learning and can ensure that reinforcement learning converges to and/or tracks an optimizing solution based on the behavior of the simulated controller (e.g., model predictive controller). The model is shown in FIG. 7 as the edge model 704.

The model creation computing system 614 can perform one or more operations to edge-ify the model, i.e., to reduce a size of the model, a required processing power for operating the model, or otherwise modify or adapt the model to enable the model to be transferred to the edge controller 602 and to be used locally on the edge controller 602 during online operations. The operations to edge-ify the model may make the model more lightweight or suitable for running on an edge device with limited computing power, as opposed to a centralized building management system controller or cloud-based controller with significantly more computing power or computational resources (e.g., more processor power, more memory, etc.). Configuration of the edge controller 602 which enables execution of the model and reinforcement learning operations on limited computing hardware is described in detail below with reference to FIG. 7.

The occupancy system 608 is configured to provide information about occupancy a space served by the edge controller 602 (e.g., a space heated, cooled, or ventilated by equipment controlled by the edge controller 602), for example an occupancy forecast. The occupancy forecast can indicate whether the space will be occupied at one or more upcoming times. In some embodiments, the occupancy forecast indicates a degree of occupation of the space expected at one or more upcoming times, for example a number of people expected to be in a space, an expected population density of a space, an expected ratio of number of people to maximum or target occupancy, etc. The occupancy forecast can be based on a schedule for a building (e.g., user-defined) and/or predictions based on historical occupancy data (e.g., as measured by occupancy sensors or an access/security system). The occupancy forecast can be used by the edge controller 602 in determining the internal control value for use in operating the actuators 604. For example, the edge controller 602 may use the occupancy forecast as an disturbance input which allows the edge controller 602 to compensate for heat expected to be provided to the space by occupants (e.g., from occupant body heat). As another example, the edge controller 602 may use the occupancy forecast by ignoring or relaxing (e.g., increasing in cooling mode, decreasing in heating mode) the temperature setpoint from the active setpoint management service 612 during time steps where the space is forecast to be unoccupied.

The weather service 610 is shown as providing a weather forecast to the edge controller 602. In some embodiments, the weather forecast and the occupancy forecast combine to form a disturbance forecast provided to the edge controller 602 as shown in FIG. 7. The weather forecast can include values for weather-related variables such as outdoor air temperature, wind speed, wind direction, humidity, cloud cover, solar irradiance, precipitation rates or amounts, etc. The weather forecast can include values for such variables over an upcoming time period, for example a set of values for each hour of the next 12 hours, a set of values for each 15 minutes of the next three hours, etc. The weather service 610 can be publically or commercially-available meteorological service, for example a service of a government agency which makes weather forecasts available via the Internet.

The sensors/meters 606, the occupancy system 610, the weather service 608, and/or the BMS controller 366 combine to provide current state information and a disturbance forecast to the edge controller 602. In some embodiments, the current state includes one or more of the following variables: indoor air temperature setpoint, cooling setpoint, heating setpoint, coil power, HVAC power, actual indoor air temperature, occupant comfort rating (e.g., predicted mean vote, percent of persons with local discomfort), mixed air mass flow, mixed air temperature, outdoor air mass flow rate (e.g., into an air handling unit), outdoor air temperature, return air flow rate, return air temperature, supply air flow rate, supply air temperature, damper position(s), valve position(s), actuator status, fan speed, compressor speed, etc. In some embodiments, the disturbance forecast includes one or more of solar radiation (e.g., direct and/or diffused solar radiation), outdoor relative humidity, outdoor air temperature, wind direction, wind speed, and occupancy information.

As shown in FIG. 7, the edge controller 602 includes protocol agents 701. For example, the protocol agents can be programmed to normalize, translate, etc. data from multiple communication protocols as may be used by different sensors, meters, data sources, etc. into a common format. The protocol agents 701 can provide connection to the equipment 604, sensor & meters 606, occupancy system 610, and weather forecast via standard protocols like BACNet, OPC-UA, MQTT, etc. using established protocol agents. The edge controller 602 also includes a software development kit (SDK) 703 which can be used if a connection needs to be made to a component which is not providing standard industry protocol interfaces, in which case the SDK 703 can be used to provide such interfaces. The protocol agents 701 and the SDK 703 can provide data on to a message bus 705 in a common format (e.g., BRICK, common data model).

As shown in FIG. 7, the edge controller 602 includes an analytics engine 700 in an RL edge engine 702. The analytics engine can execute logic in a functional programming language, for example, to provide pre-processing of data and perform feature generation from the various inputs that provide the state and disturbance information in various embodiments. The analytics engine 700 may perform interpolations, averages, extrapolations, etc. to fill a state or disturbance vector such that values are provided for all variables in a format suitable for input to tan RL edge model 704 of the edge controller 602. As another example, the analytics engine 700 can be programmed to synchronize data from the various data sources, such that data which may arrive or correspond to slightly different points in time can be aggregated into a vector or other format indicating values for a given time step. Other feature generation features in which the analytics engine 700 generates inputs for the RL edge model 704 based on state and disturbance information can be provided in various embodiments (e.g., pattern recognition, trend analysis, etc.). In some embodiments, the analytics engine 700 outputs a current state vector with current values of state variables (i.e., values associated with a current time step) and a matrix or set of vectors with forecast values of disturbance variables (e.g., twelve vectors or columns showing values for each fifteen minutes for the next three hours for the disturbance variables).

The analytics engine 700 may provide such features (e.g., normalized, synchronized state and disturbance vectors) to the RL edge model 704. The edge reinforcement learning engine 702 is configured to use the state and disturbance values from the analytics engine 700 to determine one or more control values for the actuator(s) 604 using the edge model 704 while updating the edge model 704 to reinforce learning of the edge model 704, as further described in the following passages. The analytics engine 700 can act as a stream processing component which consumes input streams, process the corresponding data, and publishes results base as output streams to the message bus 705 with low latency and by acting on stream data without storing data.

The edge model 704 may be an artificial intelligence model, for example a neural network or other machine learning (e.g., reinforcement learning) model. As discussed above, the edge model 704 may be created and initially trained on computing resources separate from the edge controller 602 (e.g., on model creation computing system 614) and then provided in a trained state to the edge controller 602, such that the edge model 704 shown part of the edge reinforcement learning engine 702 in FIG. 7 is pre-trained before use in online control of actuator(s) 604.

The edge model 704 may receive values of state and disturbance vectors as inputs (e.g., at input nodes of a network model) and use such inputs to determine a control value for the one or more actuator(s) 604 (or other action), for example at an output node of the network model. In some embodiments, the control value is a setpoint for an internal condition of a unit of equipment, for example for a mixed air temperature of an air handling unit. In some embodiments, the control value is a change in an internal condition of the equipment to be achieved at a next time step, for example a change in mixed air temperature of an air handling unit (e.g., increase by u degrees, decrease by u degrees). The edge model 704 consumes input streams, runs the machine learning model with the data from the input streams, and publishes outputs to the message bus 705 where such outputs can be processed by the analytics engine 700 before being sent to equipment/actuator/etc. for control, in some embodiments.

The message bus 705 is configured to receive the control value (or other action) from the edge model 704 (e.g., from an output node of the edge model 704) and provide a control value or signal for the one or more actuator(s) 604. The message bus 705 and the edge model 704 are enabled to operate on streams of data in some embodiments, thereby substantially eliminating latency in the control loop and reducing memory requirements. In some embodiments, the message bus 705 and/or the RL edge engine 702 may use various information to help control the actuator(s) 604 to achieve the control value determined by edge model 704. For example, if the control value is a change in mixed air temperature, the message bus 705 and/or the RL edge engine 702 may use outdoor air temperature and return air temperature information to determine whether to increase the return air or increase the outside air by adjusting corresponding dampers in order to move the mixed air temperature in the direction indicated by the control value output from the edge model 704. In some embodiments, the message bus 705 and/or the protocol agents 701 or SDK 703 translates the control value from the edge model 704 into a communications protocol used by the actuator(s) 604. Various such functions for enabling control can be provided by the message bus 705 and/or other element of the edge controller 602 in various embodiments.

The RL edge engine 702 operates to update the edge model 704, in some embodiments updating one or more parameters of the edge model 704 at the same frequency at which control outputs are generated by the edge model 704 (e.g., at a same frequency that new state information is provided). The RL edge engine 702 may use a reward function that quantifies an amount of deviation of the actual indoor temperature served by equipment controlled by the edge controller 602 (with the actual indoor temperature affected by operation of such equipment) relative to the indoor temperature setpoint for the space. The reward function may also depend on other state information such as power consumed directly by the equipment (e.g., by a fan of an air handling unit, to drive motors of actuator(s) 604, etc.) or indirectly at the equipment (e.g., energy transferred to air from a heating or cooling coil in an air handling unit), such that the reward function has energy-consumption-related information included in the reward function. In some embodiments, the edge model 704 is changing control variables based on a control policy valid for a current time step, which is continuously updated (i.e., at each time step) based on input vectors and current reward value, for example updated to maximize an accumulated reward and/or minimize an accumulated cost.

Figure 9:
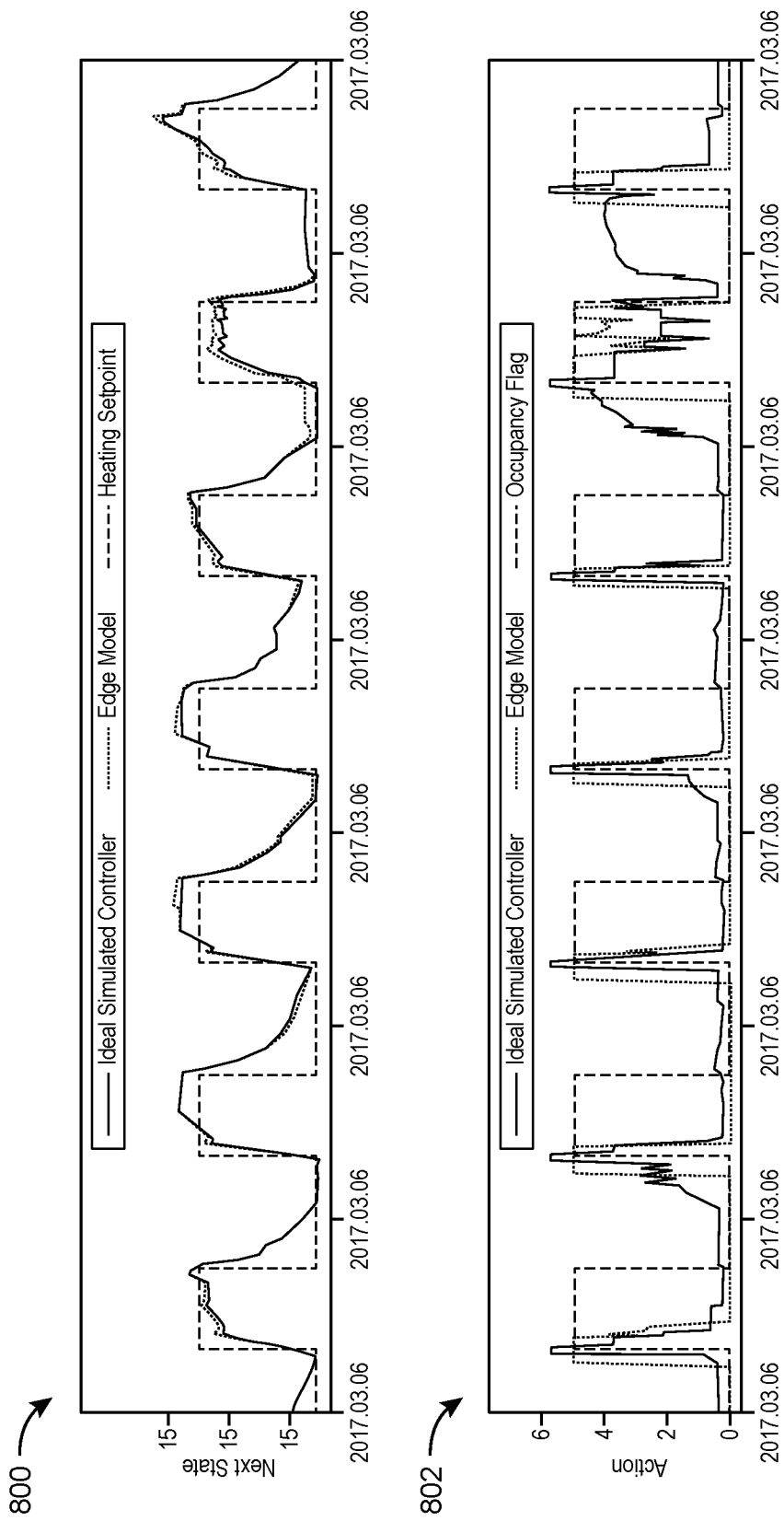
FIG. 9 is a graphical representation of experimental data showing results provided by the control system of FIG. 6, according to some embodiments.
Figure 10:
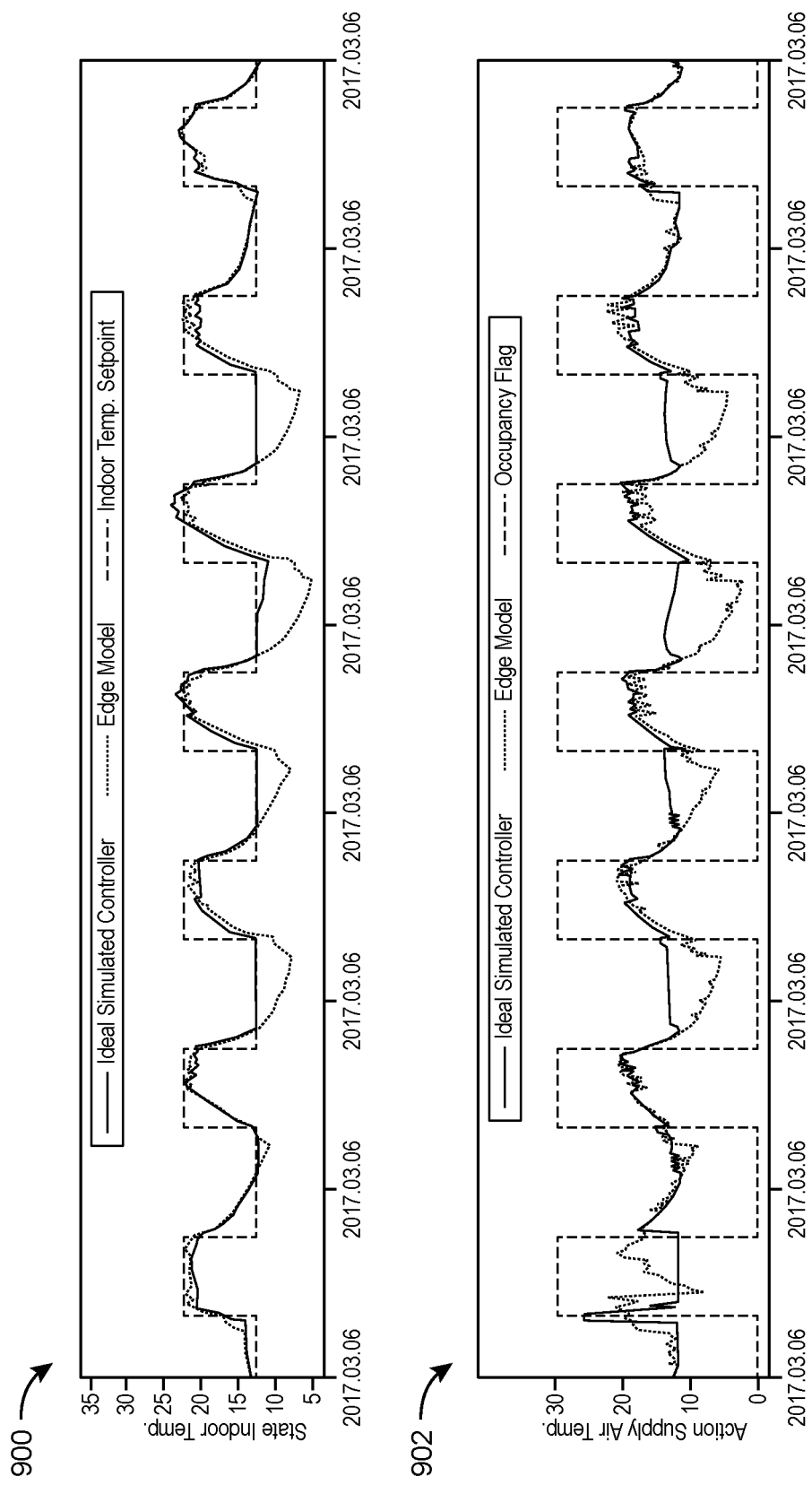
FIG. 10 is a graphical representation of experimental data showing additional results provided by the control system of FIG. 6, according to some embodiments.

The RL edge engine 702 can operate to determine adjustments to one or more parameters of the edge model 704 which optimize the reward function, for example subject to constraints which limit the amount by which a parameter can be changed from its current value. For example, the RL edge engine 702 can check whether a marginal change in parameter value would improve the value of the reward function (i.e., reduce deviation of temperature from setpoint, reduce energy consumption) and, if so, make the marginal change to the parameter value of the edge model 704 for use at subsequent time step. The edge model 704 is thereby repeatedly/constantly updated online and over time to locally reinforce learning initially performed remotely at the model creation computing system 614. This reinforcement learning provides improved performance as time progresses, as illustrated in FIGS. 9-10 described below, and provides automated model adjustments as changes to the space and/or equipment occur (e.g., different furniture, equipment degradation, utilization changes).

FIG. 7 further illustrates that the message bus 705 can optionally provide current state, current disturbance, and current control data via data publication 710 to data storage 712. Data storage 712 may be part of a building management system (e.g., at BMS controller 366 or connected database) or otherwise a separate device from the edge controller 602. Collection of state, disturbance, and control information at data storage 712 may not be needed for online operation of the edge controller 602 (which can operate in real-time on streaming data without reference to stored data from earlier time steps), but may be useful for assessing performance, generating key performance indicators, future training of other models by the model creation computing system 614, etc. FIGS. 9 and 10 provide graphs of example performance assessments that can be generated using stored data from data storage 712, in some embodiments.

Figure 8:
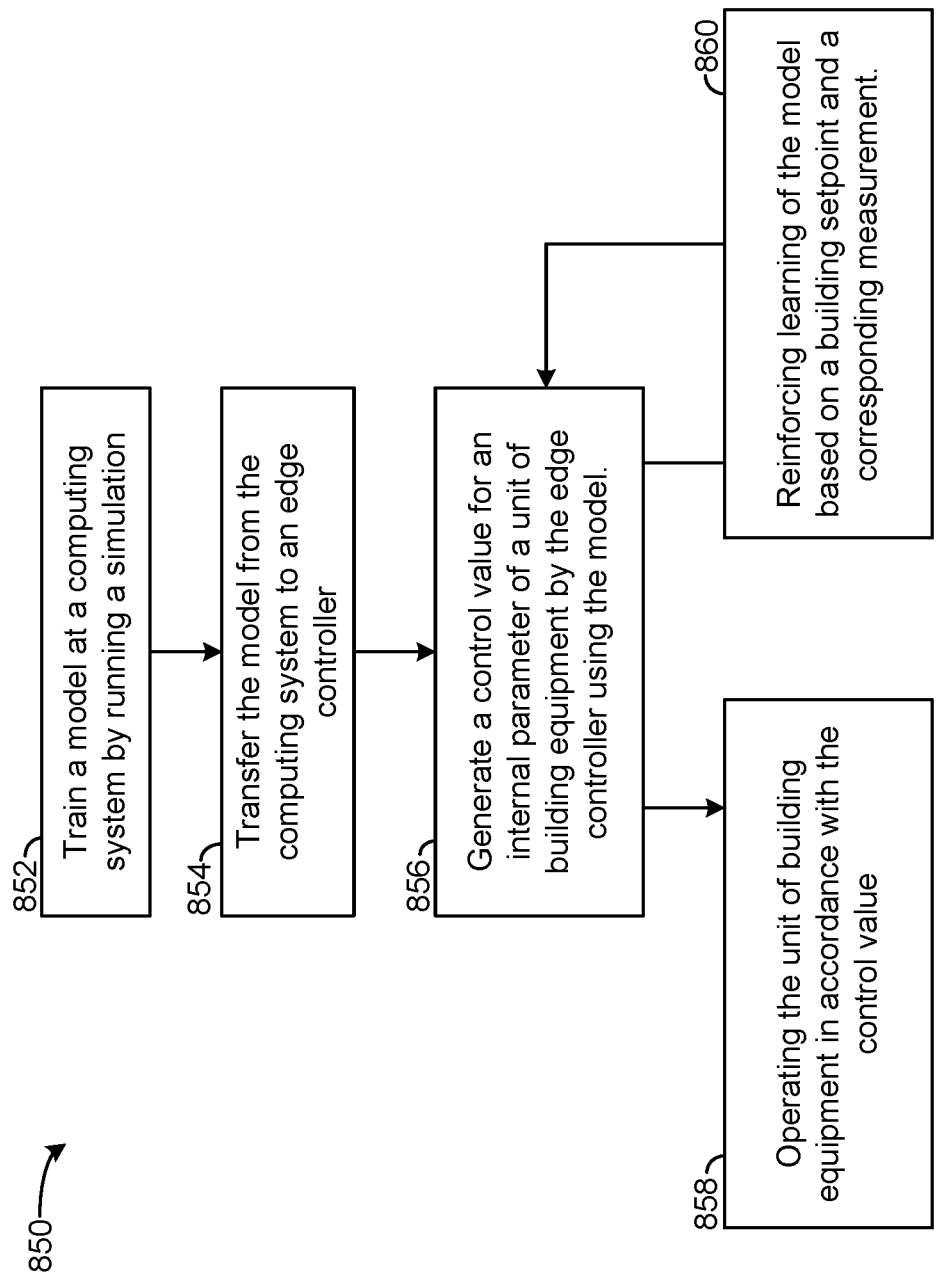
FIG. 8 is a flowchart of a control process executable by the control system of FIG. 6, according to some embodiments.

Referring now to FIG. 8, a flowchart of a process 850 which can be executed by the control system 600 is shown, according to some embodiments. Various features described above with reference to FIGS. 6-7 can be used in execution of process 850.

At step 852, a model is trained at a computing system (e.g., model creation computing system 614), for example by running a simulation (e.g., an EnergyPlus™ simulation) which includes an ideal or optimal controller. In such examples, training the model can include training the model to imitate operation of the ideal or optimal controller in the simulation. For example, the model may be trained to imitate operation of a simulated model predictive controller which runs in the simulation and generates simulated control values (e.g., mixed air temperature setpoints) which minimize an objective function under simulated conditions and simulated building dynamics. The model can thus be initiated in step 852 such that it can be expected to provide acceptable performance when initially brought online for control of building equipment.

At step 854, the model is transferred from the computing system on which it was trained in step 852 to an edge controller (e.g., edge controller 602). The transfer can occur at a production facility (factory) or distribution center, in some embodiments. In some embodiments, the transfer occurs with the building equipment and the edge controller already installed at a specific building. For example, the transfer may occur over the Internet and/or over a building network (e.g., over a BACnet network, etc.). The trained model is thereby installed on the edge controller without needing to have been created or initially trained on the edge controller. In other embodiments, the edge controller interoperates with the separate computing system while the separate computing system runs a simulation to facilitate training of the edge controller in a coordinated manner, without requiring the edge controller to have sufficient computing power to itself run the simulation.

At step 856, a control value for an internal parameter of a unit of building equipment is generated by the edge controller using the model. Generating the control value using the model can include receiving state and disturbance information as inputs to the model and outputting the control value from the model, for example as described in detail above with reference to the edge controller 602. The edge controller can use an indoor air temperature setpoint for a building space served by equipment controlled by the edge controller 602, for example. In some embodiments, the control value is a mixed air temperature value, for example a setpoint for the mixed air temperature, a desired change in the mixed air temperature (e.g. relative to the current mixed air temperature, relative to the current mixed air temperature setpoint), etc.

At step 858, the unit of building equipment is operated in accordance with the control value. Step 858 can include controlling one or more actuators, for example to adjust one or more positions of one or more dampers or valves operated by such actuators. For example, step 858 can include controlling actuators 324, 326, 328 to operate dampers 316, 318, 320 as shown in FIG. 3. Steps 852-858 thereby culminate in operation of tangible building equipment to physically affect a condition of the building equipment and/or the building.

At step 860, learning of the model is reinforced, for example based on a building setpoint and a corresponding measurement. The building setpoint may be an indoor air temperature setpoint and the corresponding measurement may be a measurement of the indoor air temperature. Reinforcing learning of the model can include adjusting one or more parameters of the model to improve a value of a reward function, for example where the reward function includes a term based on a difference between the building setpoint and the corresponding measurement. The reward function may also include a term based on energy usage of the equipment and/or a proxy for energy usage. For example, in some embodiments the control value can be used as a proxy for energy usage. Reinforcing learning of the model by adjusting parameters based on such a reward function can improve the model's ability over time to generate a control value which reduces error between the building setpoint and the corresponding measurement while also reducing energy usage or other objective. As illustrated in FIG. 8, step 860 loops back to step 856, such that the model is updated repeatedly, recursively, etc., for example each time that a control value is generated in step 856.

Referring now to FIG. 9, a graphical view of model performance following initial (offline) training by the model creation computing system 614 is shown, according to some embodiments. FIG. 9 includes a first graph 800 of temperature values over time and a second graph 802 of control values over time. As shown the first graph 800, offline, initial training enables the model to control equipment in a manner which causes indoor air temperature to substantially track the values achieved by the simulated expert control system (e.g., simulated model predictive controller). Deviation of temperature from the setpoint as shown in the graph can be indicative of lag time in reaching such temperatures due to system dynamics and attempts by the control approaches to save energy consumption or cost relative to approaches which more closely track the setpoints. As shown in the second graph 802, the control values generated by the edge model may have some deviations from values generated by the simulated expert control system, while imitating an overall shape of such values over time.

Referring now to FIG. 10, a graphical view (including third graph 900 and fourth graph 902) of model performance while reinforcement learning is in progress at the edge controller 602 is shown, according to some embodiments. In particular, FIG. 10 shows data for an initial period following initiation of online operation of the edge controller 602. As shown in the third graph 900 of indoor air temperature over time, the temperature resulting from operation of the edge controller 602 and use of the edge model 604 tracks closely with the temperature that would result from an ideal, expert, simulated control system. As shown in the fourth graph 902 of control values over time, the control value determined by the edge model has deviations from an expert simulated control value at the beginning of reinforcement learning but converges over time such that, towards the right end of the graph (later in time), performance of the edge model substantially imitates performance of a theoretical/ideal (e.g., simulated) expert control approach.

By tracking the expert, idealized approach, experimental data as shown in FIG. 10 indicates that energy requirements (e.g., heating demand) for operation of HVAC equipment can be significantly reduced by operation of the edge model with reinforcement learning as described herein (e.g., from 43709 kW for conventional approach to 24901 kW for the approach described herein, in one example). Further, providing such advanced control at the edge (e.g., locally onboard equipment) allows such advantages to be achieved under intermittent connectivity, at potentially reduced bandwidths (as full state data need not be upload to a remote resources for use in optimization algorithms), less networking complexity, and lower computing hardware requirements. Various improvements to equipment performance and control architecture are thus provided by the technologies described herein.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule Based logic and other logic to accomplish the various connection steps, processing steps, comparison steps and decision step.

What is claimed is:

1. A method comprising:
    training a reinforcement learning model to replicate outputs of a model predictive control algorithm running in a simulation, the model predictive control algorithm determining simulated mixed air temperatures which minimize an objective associated with running a simulated air handling unit in the simulation;
    generating a mixed air temperature value using the reinforcement learning model running on an edge controller, wherein an indoor air temperature setpoint and a weather forecast are inputs to the reinforcement learning model; and
    controlling damper positions of an air handling unit to achieve the mixed air temperature value.

2. The method of claim 1, further comprising automatically updating, by the edge controller, the reinforcement learning model based on a reward function comprising a difference between the indoor air temperature setpoint and a measured indoor air temperature.

3. The method of claim 2, wherein the reward function is further based on an occupancy of a space served by the air handling unit.

4. The method of claim 1, wherein using the reinforcement learning model comprises performing feature generation on streaming input data based on logic in a functional programming language and using variables resulting from the feature generation as further inputs to the reinforcement learning model.

5. The method of claim 1, wherein generating the mixed air temperature value using the reinforcement learning model running on the edge controller further comprises processing streams of building and equipment state information at the edge controller.

6. The method of claim 1, further comprising:
    creating the reinforcement learning model on a computing system separate from the edge controller; and
    transferring the reinforcement learning model from the computing system to the edge controller after the creating.

7. The method of claim 1, wherein the inputs to the reinforcement learning model further comprise an occupancy forecast.

8. An air handling unit, comprising:
a plurality of dampers;
a local controller programmed to control the plurality of dampers by:
generating a mixed air temperature value using a reinforcement learning model running on the local controller, wherein a temperature setpoint and a weather forecast are inputs to the reinforcement learning model, wherein the reinforcement learning model is trained to replicate simulated mixed air temperatures output by a model predictive control algorithm running in a simulation, the model predictive control algorithm determining simulated mixed air temperatures which minimize an objective associated with running a simulated air handling unit in the simulation; and
controlling damper positions of the air handling unit to achieve the mixed air temperature value.

9. The air handling unit of claim 8, wherein the local controller is further programmed to automatically update the reinforcement learning model using reinforcement learning based on a difference between an indoor temperature setpoint for a building served by the air handling unit and a measurement of the indoor temperature setpoint.

10. The air handling unit of claim 9, wherein the mixed air temperature value is a change in mixed air temperature of the air handling unit to be achieved by controlling the damper positions and the indoor temperature setpoint is a value to be achieved for a building and received by the local controller from an active setpoint management service.

11. The air handling unit of claim 8, wherein the local controller is further programmed to automatically update the reinforcement learning model using a reward function comprising a difference between one of the inputs to the reinforcement learning and a measurement of a measured condition of a space served by the air handling unit.

12. The air handling unit of claim 8, the local controller is programed to perform feature generation on streaming input data based on logic in a functional programming language and to use variables resulting from the feature generation as further inputs to the reinforcement learning model.

13. The air handling unit of claim 8, wherein generating the mixed air temperature value using the reinforcement learning model running on the local controller further comprises processing streams of building and equipment state information at the local controller.

14. The air handling unit of claim 8, wherein the local controller is further programmed to apply an occupancy forecast as an input to the reinforcement learning model.

15. The air handling unit of claim 8, wherein the temperature setpoint is an indoor air temperature setpoint in units of degrees.

* * * * *